United States Patent [19]

Wilson

[11] 4,169,221
[45] Sep. 25, 1979

[54] METHOD AND APPARATUS FOR TESTING A SUBSCRIBER LINE GROUP MARKER OF A TELEPHONE CENTRAL OFFICE CROSS BAR SWITCHING DEVICE

[76] Inventor: Gordon R. Wilson, 1060 Chantilly Dr., Alpharetta, Ga. 30201

[21] Appl. No.: 919,969

[22] Filed: Jun. 28, 1978

[51] Int. Cl.² ............................................. H04M 3/24
[52] U.S. Cl. ............................................... 179/175.23
[58] Field of Search ................... 179/175.2 R, 175.23, 179/175.25, 175.3 R; 324/51

[56] References Cited
U.S. PATENT DOCUMENTS
3,555,208  1/1971  Arndt .............................. 179/175.23

Primary Examiner—Thomas W. Brown
Assistant Examiner—Joseph A. Popek

[57] ABSTRACT

Disclosed is a method and apparatus adapted to be used in testing a subscriber line group marker, of a telephone central office switching device, wherein such markers are energizable by application of central office battery potential through a normally open path but closed in response to a subscriber's telephone going off hook and/or an incoming call from a distant office. Testing takes place without removing the marker physically from its central office switching environment by essentially eliminating any chance of it being electrically energizable by anyone but the testing party. Such is accomplished by placing the instant of time the marker is to be tested essentially under the sole control of the testing party by:

(a) electrically obstructing said normally open path so that it remains open even when a subscriber goes off hook and/or notwithstanding the presence of an incoming call demanding service;
(b) providing a normally open electrical path from the central office battery to the marker; and
(c) at an instant of arbitrary choosing, closing the last mentioned electrical path and applying for predetermined period of time central office battery potential directly to the marker to energize it.

6 Claims, 20 Drawing Figures

Contacts 17, 63, 34, or 79, 217, 263, 234 or 279 (on Typical Line Marker Access Circuit) of Figure 4A and 4B.
See also Figures 7A, 7B, and 7C.

METHOD AND APPARATUS FOR TESTING A SUBSCRIBER LINE GROUP MARKER OF A TELEPHONE CENTRAL OFFICE CROSS BAR SWITCHING DEVICE

DESCRIPTION OF THE PRIOR ART

When a marker in a telecommunications central office switching apparatus of the type hereinafter described is suspected of being faulty, for one reason or the other, it may be tested in one of two ways: (a) physically take it out of its switching environment, remove it to a workbench, and there attempt to determine if it is faulty, or (b) attempt to electrically seize the marker while it is in its switching environment, using a telephone handset or prior art test code senders plugged into a "test line." The presence of dial tone in a telephone test handset or test code sender indicates that the marker in question is operating perfectly. Absence of dial tone indicates a faulty marker.

Both of these methods of testing have serious practical drawbacks. Taking the marker physically out of the central office switching environment not only disrupts service to subscribers but also creates testing problems, i.e. procedures must be devised and equipment designed to carry out the desired function of finding out what is wrong with the marker on the workbench. Simply stated, to adequately test a suspected marker in a workbench environment requires a "mock up" central office switch so that the marker can be electrically tested, i.e. will it render dial tone or not. Such is expensive, time consuming and usually not generally used in day to day practice. The second prior art method of testing, i.e. testing without removing it from the central office circuit, presents a problem of accessibility to a particular marker.

Generally speaking, when there is a malfunction in the central office switch and a marker is suspected to be the cause of the problem, marker testing must be carried out to ascertain whether it is faulty or some other component of the central office switch is the cause of trouble. A pair of markers serves two 500 line groups. Either marker may operate in either line group, for originating or terminating calls, but both markers cannot serve the same line group simultaneously. Using a test line, located in the line group on which the particular marker operates in conjunction with a telephone handset, one can attempt to seize the desired marker. This attempt, however, will be in competition with all other subscribers who might also desire service of that marker at the same time. Such presents a difficult problem of prudent utilization of valuable use of time of telephone employees, particularly for the ones who are doing the testing. About the only thing a testing party can do is to wait until the early morning hours, namely 1 to 4 a.m., when the traffic is expected, but not necessarily guaranteed, to be at a low ebb. Usually the traffic—the number of subscribers demanding the use of a marker in a particular line group—in the early morning hours is low, thus increasing the chances of the testing party of seizing (energizing) a particular marker. Using this prior art mode of testing, a suspected faulty marker must be left in service during peak usage periods until the traffic dies down, irritating subscribers and testing-repair personnel alike.

The present invention permits a testing party to test a suspected marker at any arbitrary time, regardless of the traffic intensity, and be virtually, but not absolutely assured that the specific marker in question will be seized.

As known in the prior art, a marker performs its function—more fully described elsewhere in this specification—in less than a second and then "moves out," i.e. is electrically removed from the control of the subscriber. Thus, the desirability of repeatedly seizing the marker in question, virtually without any competition from other subscribers, immediately becomes of importance. By using the described method and apparatus, such is achieved without physically removing the marker from its central office switching environment and at a time of arbitrary choosing, irrespective of the traffic present at the time chosen. Furthermore, the testing can be repeated as many times as desired.

SUMMARY OF THE INVENTION

The invention involves a testing apparatus and a method of preparing and testing (energizing) a preselected marker in a telephone central office switching apparatus, of the type having markers energizable by application of central office battery potential through a path normally open but responsive to and closed when a subscriber's telephone goes off hook and/or there is the electrical presence of an incoming call from a distant office so that the instant of time desired to test (energize) the marker is essentially under the sole control of one desiring to do so, comprising the following steps: (a) electrically obstructing said normally open path so that it remains open, even when a subscriber goes off hook and/or there is the presence of an incoming call; (b) providing a normally open electrical path from the central office battery potential directly to the marker; and (c) at an instant of arbitrary choosing, energizing the marker by closing the last mentioned electrical path and applying for predetermined length of time central office battery potential directly to it.

BRIEF DESCRIPTION OF THE DRAWINGS

FIGS. 5B and 5C schematically show a telephone handset connected to the SOLC or STT relay of a line marker access circuit of FIGS. 4A and 4B respectively to be used in conjunction with the testing circuit of FIG. 5A.

DESCRIPTION OF THE PREFERRED EMBODIMENT

Prior Art Background

Figure 1A:
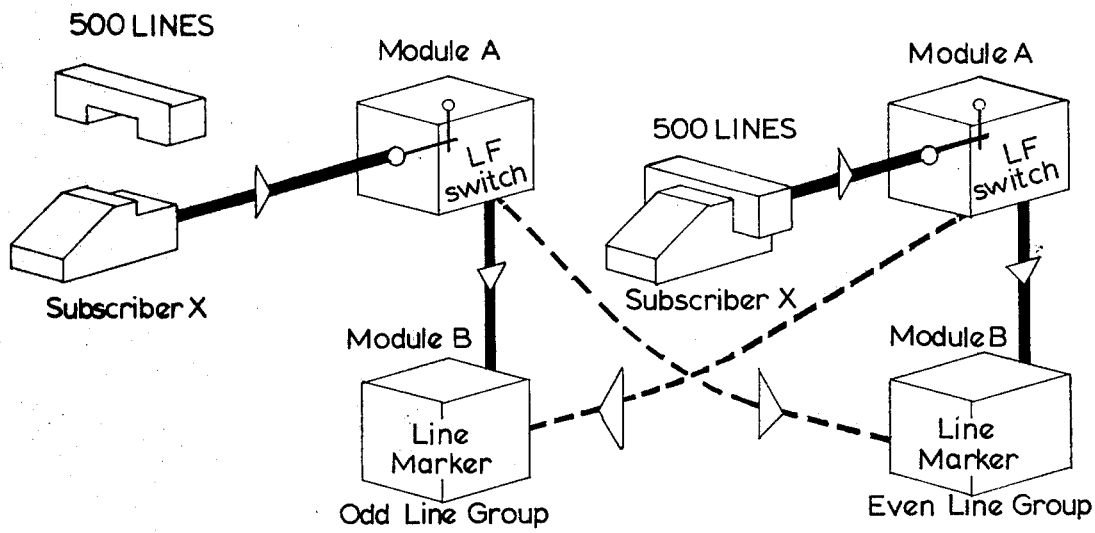
FIGS. 1A, 1B, 1C, 1D, 1E, 1F, and 1G are block diagrams functionally describing the progress of a local-to-local telephone call through a telephone central office switching system of the crossbar type.

The instant invention deals broadly with the testing of line group markers in prior art telephone central office switching equipment of the crossbar type. A crossbar type switching system is defined as an automatic telephone switching system using crossbar switches where dialed information is received and stored by common circuits, which select and test the switching paths and control the operation of the switching mechanisms. Line group markers in a crossbar central office switching apparatus have the following functions: they (a) locate the calling line or trunk, (b) test paths between the calling and called lines or trunks, and (c) mark an idle path before setting up a connection.

As is well known in the prior art, the basic switching elements of prior art crossbar type central office unit can be divided into four functional groups: namely, line equipment, common equipment, group selector, and trunk equipment. Line equipment includes subscriber line groups, line group markers and intra-office trunks. Common equipment is shared by all line groups and trunks, and performs the "control and connect" operation for each call. The group selector is considered the "pivot point" in the switching system because all calls, whether local, incoming, outgoing or tandem must pass through the group selector. The trunk equipment includes inner-office trunks and associated equipment.

With respect to the line groups, classified under line equipment, such is a group of 1,000 line increments. A fully equipped line group consists of 500 lines and associated switching equipment, such equipment being subscriber line "A" switches (SLA's) subscriber line "B" switches (SLB's) subscriber line "C" (SLC's), subscriber originating trunks (SOT's), subscriber terminating trunks (STT's), and subscriber register links (SRL's). Subscriber line switches SLA and SLB provide switching access to and from the subscriber lines. Subscriber originating trunks (SOT) serves as a link between the SLB switches and the group selector. The STT picks up at the outlet of the group selector and via a subscriber line switch SLC there is provided an access back through the SLB and SLB switches to a subscriber line circuit. All of the foregoing is well known and is recognized as prior art.

Subscriber line markers, the focus point of the instant invention, have as their function on an originating call to identify a line requesting service, select an idle register, test for and close a path from that line through the SLA, SLB, SOT, and SLR switches to a selected register. On a terminating call, (for example one from a distant central office) the marker must find the line that the call is bound for and test its condition. If the line is idle, the marker secures a path from the STT through the SLC, SLB, and SLA switches to the line. If the line is not idle, the marker indicates this fact to the sender, which in turn will cause all connections for this call to be released and the calling subscriber will receive a busy tone. A pair of markers serves two 500-line groups. Either of such marker may operate in either line group, originating or terminating, but both markers cannot serve the same line group simultaneously. The preceding also is recognized to be a part of the prior art.

In order to understand the foregoing, a simplified diagramatic description of the progress of a typical prior art call through a crossbar switching system is hereinafter set forth, describing a local-to-local call local-to-trunk and incoming call from distant office. A detailed description of such calls are not described because such are well known in the prior art and are thus unnecessary.

Local-to-Local Call—Step 1—FIG. 1A

Referring to FIG. 1A, a call originates when a Subscriber X's telephone is taken off hook as illustrated. A normally open line relay in module A detects the tip and ring short caused by the subscriber's telephone going off hook and causes a signal to be sent to an idle line marker in module B. This signal indicates that some line in a group of 500 has requested service. As can be viewed from FIG. 1A, Subscriber X is attempting to call Subscriber Y, both of the subscribers being within the same line group and serviced by the same central office switching equipment.

Figure 1B:
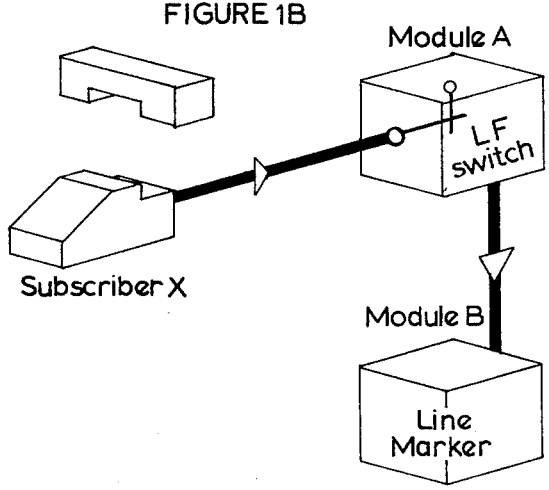

Local-to-Local Call—Step 2—FIG. 1B

Referring to FIG. 1B, the line marker having received a message requesting service identifies module A and the calling line within module A.

Figure 1C:
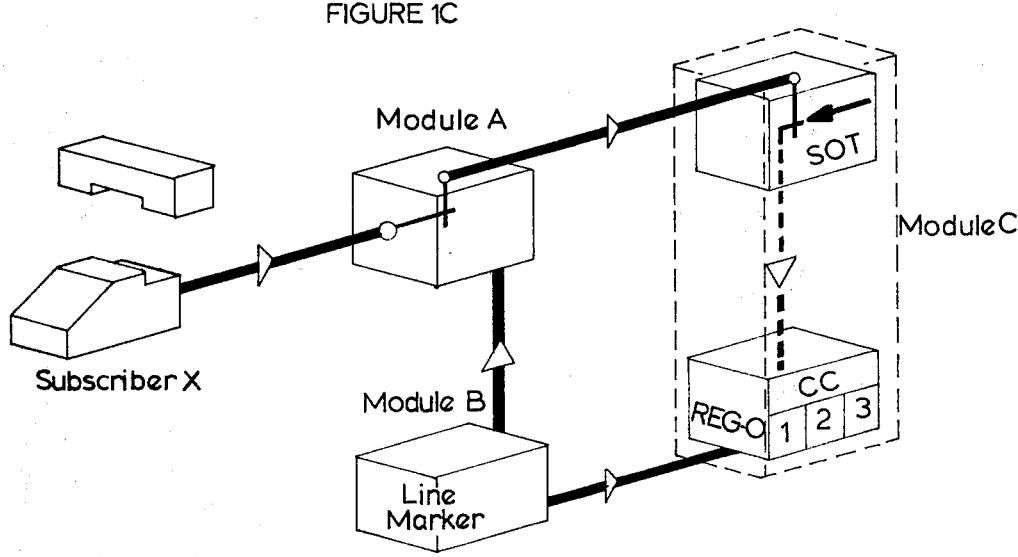

Local-to-Local Call—Step 3—FIG. 1C

Line marker of module B, after the identification of Step 2, makes an idle line test and selects an originating register (REG-O) in module C and also establishes a path between the originating subscriber's line and the selected REG-O via subscriber originating trunk (SOT).

Figure 1D:
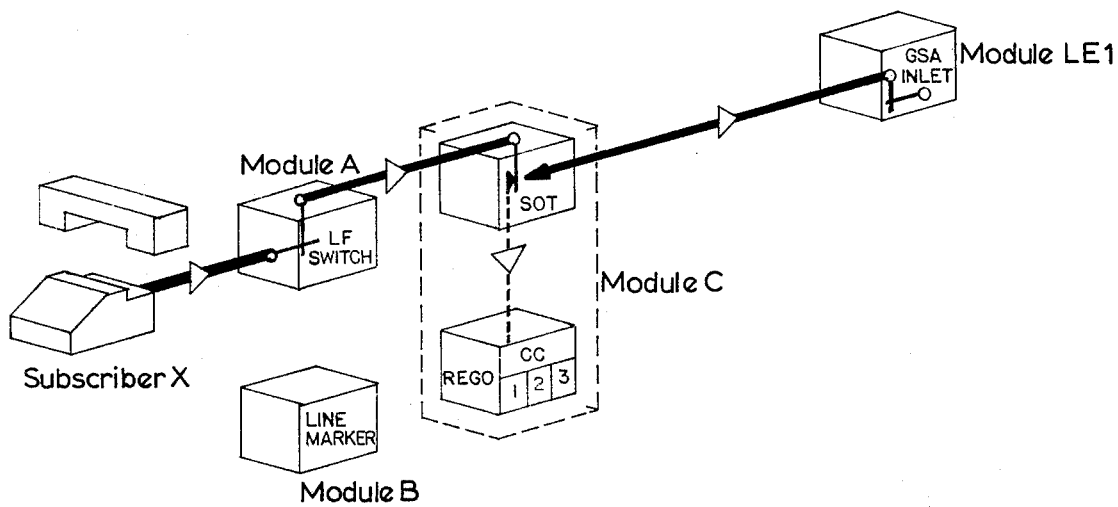

Local-to-Local Call—Step 4—FIG. 1D

Line marker (module B) releases and the originating subscriber is connected to and receives dial tone from the REG-O via an SOT (module C) through the LF switch in module A. An associated local group selector unit (vertical) or module LE1 is identified. Subscriber X dials the first three digits of a seven digit directory number. The REG-O has storage bins for only four digits. The first three digits (office code) are each identified by the REG-O counting chain and are stored in the REG-O digit storage bins. The REG-O analyzes the digits and recognizes the local office code, marking the REG-O for a local terminating call. The REG-O digit storage bins clear and then reset.

Figure 1E:
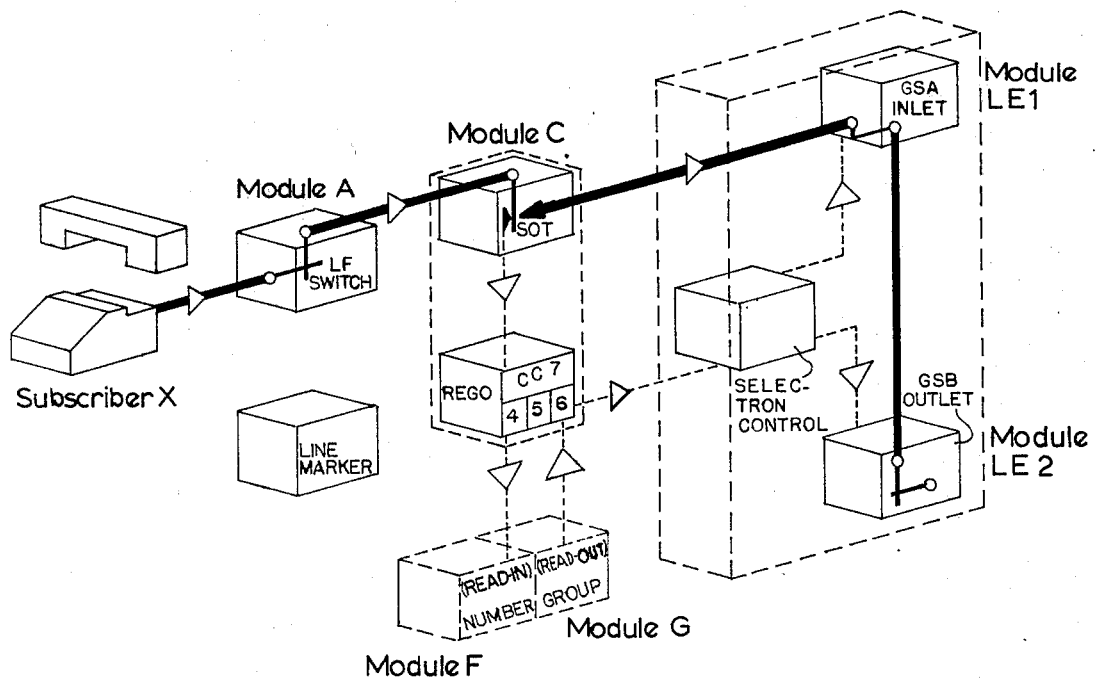

Local-to-Local Call—Step 5—FIG. 1E

The fourth, fifth, sixth, and seventh digits dialed by the calling Subscriber X are received and stored in the REG-O digit storage bins. The register is designed so that on a local call a complete directory number must be dialed before any of the digits can be used. When the seventh digit is received, the last four digits are simultaneously extending to the number group (modules F and G). Directory number information is translated into a line number and party identification. This information is then forwarded from the number group through the REG-O to the group selector control (modules LE1 and LE2) which sets GSA and GSB type switches.

Figure 1F:
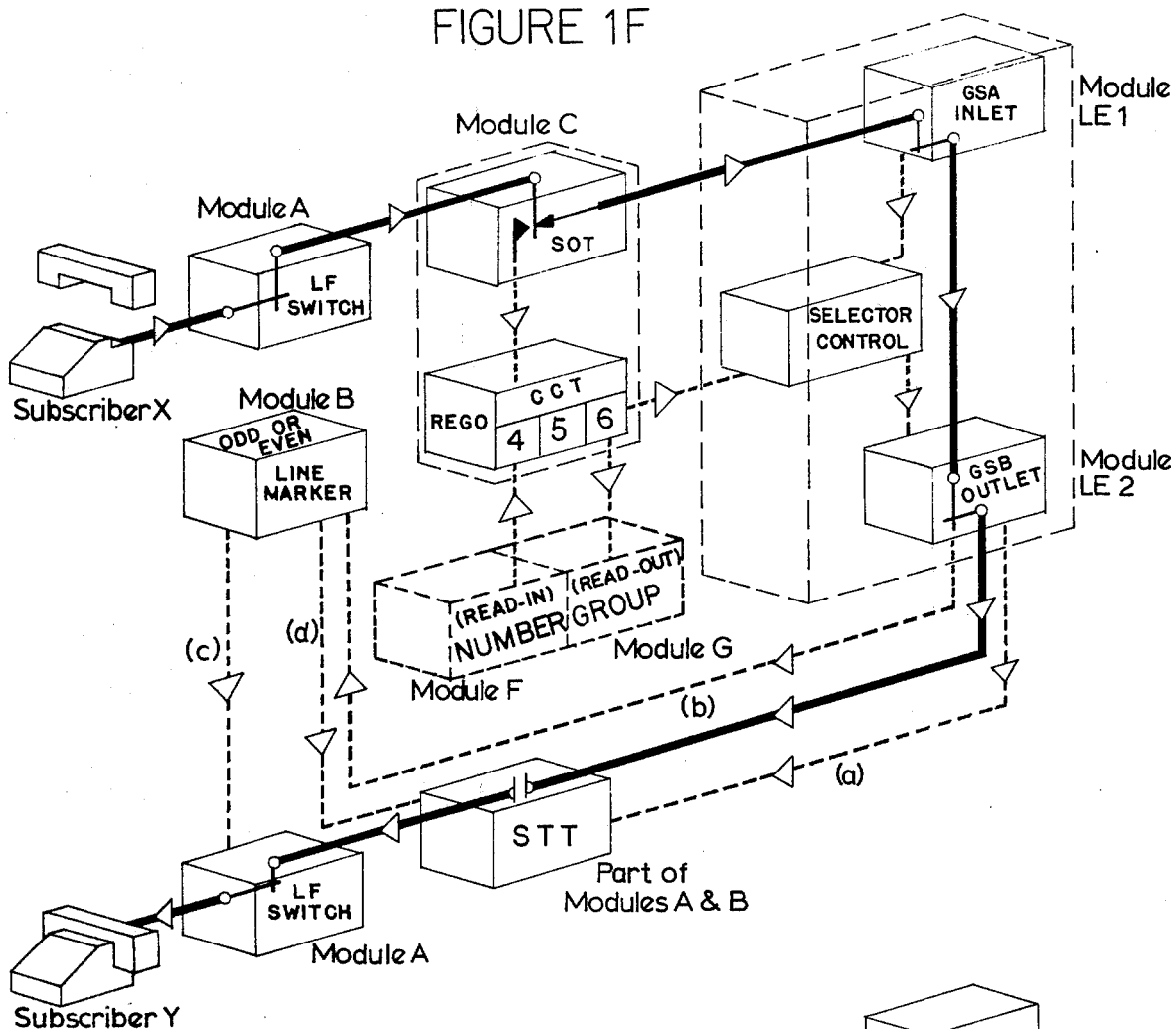

Local-to-Local Call—Step 6—FIG. 1F

The group selector control in modules TE1 and TE2 simultaneously:

(a) tests for and selects the required subscriber terminating trunk (STT) associated with the desired terminating line group, and (b) causes the STT to seize an idle line marker (module B) to extend the terminating line number into the line marker. The line marker (c) selects the path through the LF switch (module A) to the terminating line, and (d) extends party identification (ringing) into the STT. The line marker also tests the availability of the terminating line and if busy indicates this condition in the STT.

Figure 1G:
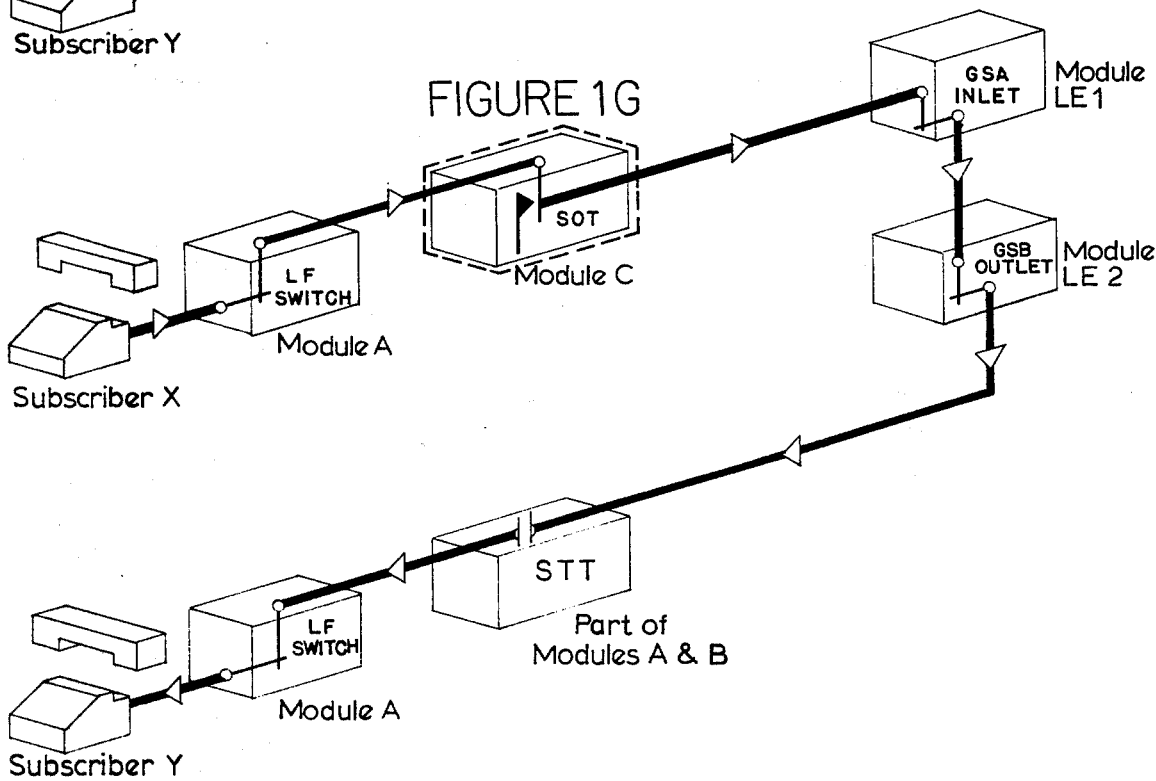

Local-to-Local Call—Step 7—FIG. 1G

When the path has been completed to the terminating line (average 600 milliseconds after the last digit is dialed), the REG-O group selector control, and line marker control equipment release. The STT provides ringing (or busy), talk battery, and supervisory functions for the connection. Called Subscriber Y then goes off hook as shown in FIG. 1G thus creating a talking path from Subscriber X to Subscriber Y.

Figure 2A:
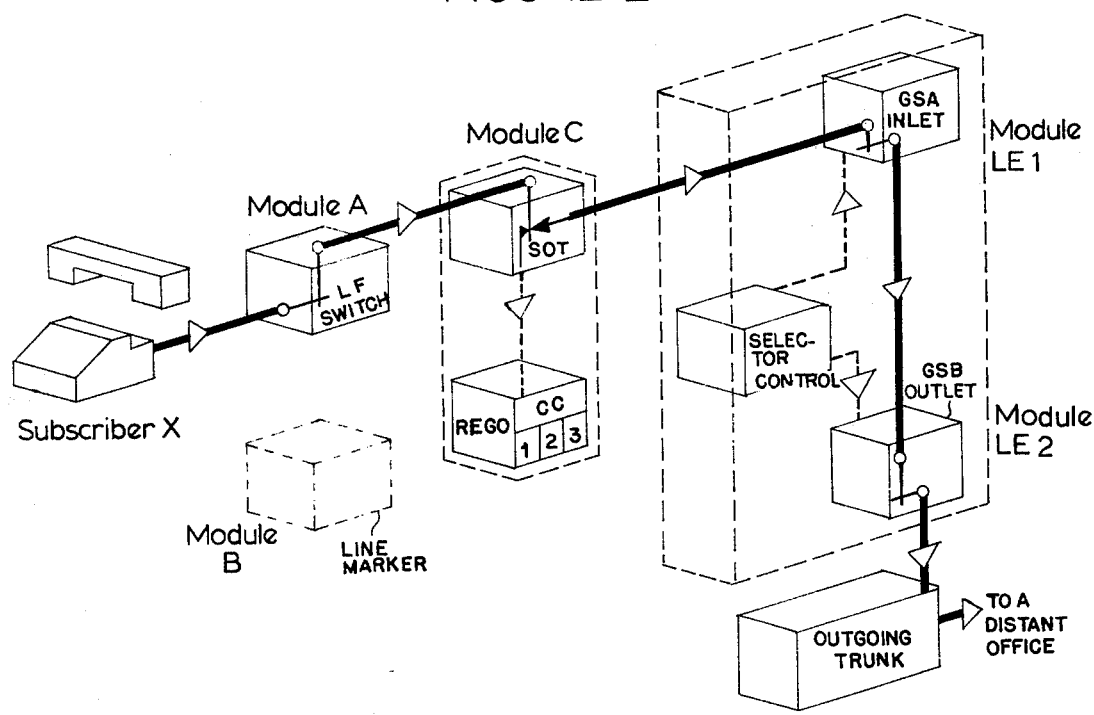
FIGS. 2A and 2B are block diagrams functionally describing the progress of a local-to-trunk telephone call through a telephone central office switching system of the crossbar type.

Local-to-Trunk Call—Step 1—FIG. 2A

Referring to FIG. 2A, a local-to-trunk call originates in the same manner as a local-to-local call. Line marker (module B) releases. Originating Subscriber X is connected and receives dial tone from the REG-O via an SOT (module C) through the LF switch module A. Associated local selection inlet, vertical of the GSA switch in the module LE1, is determined. Subscriber X dials the first three digits of a seven digit directory number and the first digits (office code) are each identified by the REG-O counting chain and are stored in the REG-O digit storage bins. The REG-O analyzes the digits and recognizes a distance office code and routes the call through modules LE1 and LE2 to an idle outgoing trunk and then to the distance office where the rest of the directory number is delivered. In a local-to-trunk call, the trunk replaces the STT.

Figure 2B:
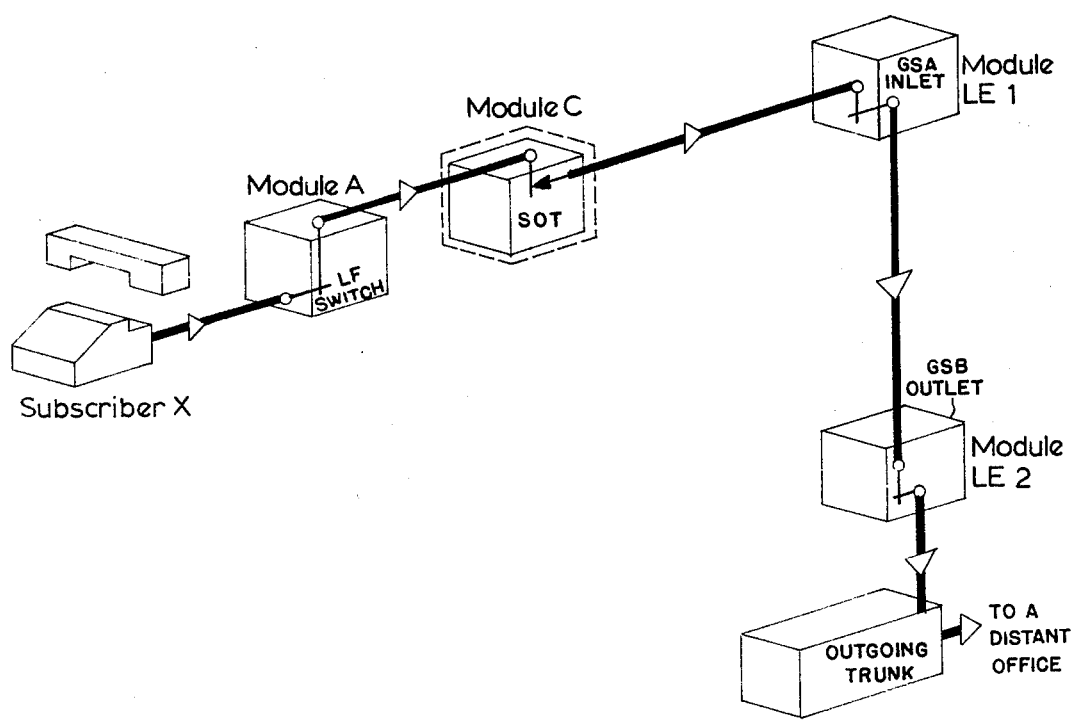

Local-to-Trunk Call—Step 2—FIG. 2B

Referring to FIG. 2B, when the trunk at the distant office is seized and the remaining four digits are forwarded to the distant office, the originating equipment (module B, REG-O and selector control) are released. Talk path is now established to the originating equipment as shown.

Figure 3A:
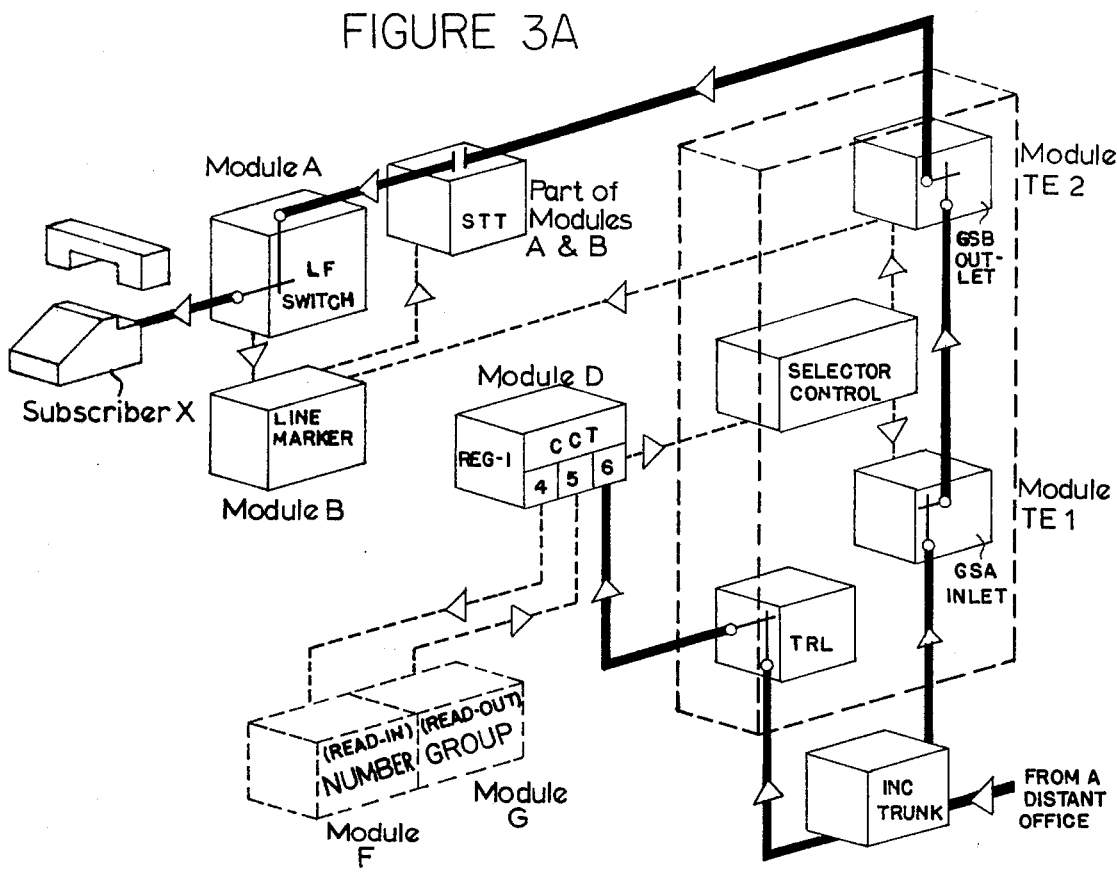
FIGS. 3A and 3B are block diagrams functionally describing the progress of an incoming call from a distant telephone office through a switching system of the crossbar type.

Incoming Call From Distance Office—Step 1—FIG. 3A

Referring to FIG. 3A, upon receipt of an incoming seizure signal from a distance office, an associated incoming trunk is seized. The call signal is extended to the Trunk Register Link (TRL) which provides linkage from the incoming trunk to the REG-I. The incoming trunk receives the last four digits of a directory number and forwards the dial pulses via TRL into the REG-1 digit storage bins. Digits are analyzed in REG-I, thus setting the register to complete the call to a local office station. When the fourth digit is received, the digits are simultaneously extended to the Number Group (modules F and G). The directory number information is translated into a line number and a party identification. This information is then extended through the REG-I to the Group Selector Control (modules TE1 and TE2), which sets the GSA and GSB switches.

Group Selector Control in modules TE1 and TE2 simultaneously (a) tests for and selects the required Subscriber Terminating Trunk (STT) associated with desired terminating line group, and (b) causes the STT to seize an idle line marker (module B) to extend the terminating line number into the line marker. The line marker (c) selects the path through the LF switch (module A) to the terminating line, and (d) extends party identification (ringing) into the STT. The line marker also tests the availability of the termination line and if busy indicates this condition in the STT.

Figure 3B:
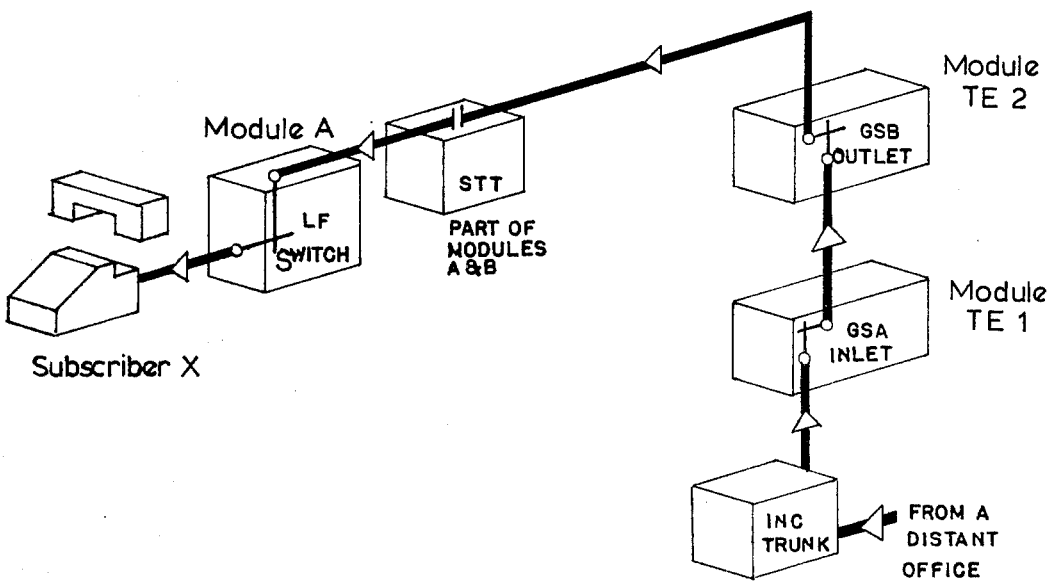

Incoming Call From Distant Office—Step 2—FIG. 3B

When the path has been completed to the terminating line; the TRL, REG-I, Group Selector Control and line marker will release. Ringing is provided from the STT. Busy signal, talk battery and supervisory functions are controlled by the incoming trunk.

Line Marker Access Circuit—Operation

Described above in a simplified manner are the basic steps of a telephone central office operation of the crossbar type. The instant invention, however, is directed towards the central office line marker and more particularly the testing of such a device without taking this device out of its otherwise intended service environment. Line markers contemplated to be tested would be line markers for both odd and even line group.

Figure 4A:
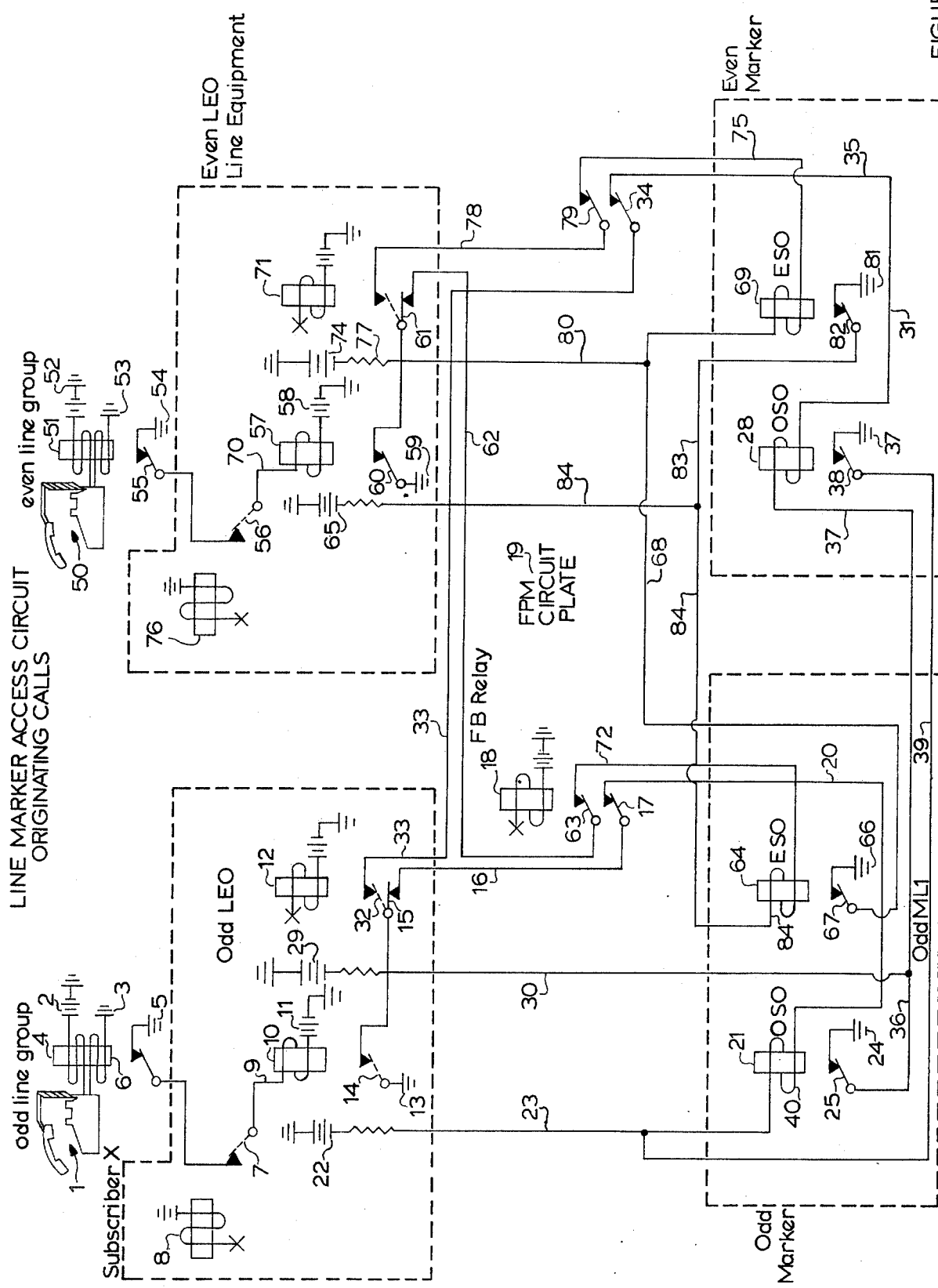
FIGS. 4A and 4B are simplified schematic diagrams of a typical line group marker access circuit of a crossbar telephone central office switching system for originating and terminating calls respectively.

FIG. 4A is a schematic diagram of a typical line marker access circuit showing Subscriber X and Y, referred to in the local to local call in FIGS. 1A, 1B, 1C, 1D, 1E, 1F, and 1G. The line marker access circuit is a typical circuit, found in the prior art, and forms no part of the instant invention; however, its operation is helpful as background to the instant invention.

Subscriber Line Relay Operation (Even Line Group)—Originating Call FIG. 4A—Subscriber Y When Subscriber Y's telephone goes off hook, element 50, this action shorts the Tip and Ring wires and completes the circuit from battery 52 through winding 52 to ground 53 and operates line relay 51 in the line equipment unit. Operation of line relay 51 is the first step in the process of identifying Subscriber Y's telephone line and connecting it to an idle originating-register (REG-O). The REG-O (not shown) functions to provide dial tone to the calling line and to receive, store and outpulse the dial digits, i.e. the number called. A typical line equipment unit contains 25 line relays and can serve 25 customer lines.

Line Entrance Originating (LEO) Operation

When line relay contacts 55 operates, demand for service signal is sent to the Even LEO by extending ground 54 through contacts 55 (line relay 51), contacts 56 relay 76 and lead 70 to operate relay 57 through its coil winding to battery 58 in the even LEO. A typical LEO serves 500 lines and two associated line markers.

Overview of Alternator Circuit Operation in the Odd or Even LEO

A marker is seized by a Line Entrance Originating (LEO) unit, there being one LEO for each line group. Each LEO is dedicated to one line group.

The circuit located in the LEO, used to seize a marker, consists of three relays, 76, 57, and 71 and is called an alternator because of its ability to change from one inactive state to another. The inactive state that the alternator is in at the time it receives a call for service will determine which of the two markers it will attempt to seize. When relays 76, 57, and 71 are unoperated, i.e. in the position opposite from that shown in FIG. 4A, at the time a call for service is received, the alternator will attempt to seize the odd marker. When relays 76 and 71 are operated (as shown in FIG. 4A) at the time a call for service is received, the alternator will attempt to seize the even marker.

The active state of the alternator is that period of time in which relay 57 is operated and a predetermined number of milliseconds after it releases. It is during this time period that a marker is seized and the alternator is changed to its other inactive state.

Alternator Change (Odd or Even LEO)

During the time that an attempt is made to seize a marker, the alternator must change the state of its relays in order to prepare for seizure of the other marker.

Alternator Changed with 76 and 71 Relays Released

Relay 57 receives ground from line Relay 51 operation and operates. Through its own break contacts 60 Relay 57 begins to slow release. A set of make contacts of Relay 57 places a ground (through break contact of relay 56) on the operated winding of Relay 76. Relay 76 will operate but Relay 71 cannot operate at this time because it is receiving a ground shunt from Relay 57 through make contacts 60. Once Relay 57 releases, the ground shunt is removed from the energized windings of Relay 71, thus allowing Relay 71 to operate in series with Relay 76. Relays 76 and 71 remain operated after Relay 57 releases through the following completed series circuit: battery on the two sides of Relay 76, through the coil of 76, out one side, through make contacts 56 of Relay 76, into the two sides of Relay 71 through its coil, out one side to ground. The alternator is now prepared to seize the even marker, when Relay 57 is operated again.

Alternator Changed with Relay 76 and 71 Operated

Relay 57 receives ground from line relay 51 operation. When relay 57 is energized, its own slow release starts. At this time, with relays 76 and 71 in the operative position, Relay 71 is held operated through the contacts of Relay 71, which places ground from the Relay 57 to the hold winding of Relay 71. Relay 76 is released by ground appearing from the make contacts of Relay 57, which is routed to hold coil of Relay 71 and the "knocked down" winding of Relay 76. Ground on this winding sets up a magnetic field equal to but opposite from the magnetic field of the relay 76 operated winding. These magnetic fields cancel each other, causing Relay 76 to release. When Relay 57 releases, it removes ground from the Relay 71 hold winding. Relay 71 then will release at this time due to the operative path of Relay 71 being broken by the previous release of Relay 76. The alternator is now prepared to seize the odd marker once Relay 57 is again operated.

Odd Marker Seizure—Originating Even Line Group—Subscriber Y (FIG. 4A)

With regards to FIG. 4A, all relays are shown in the operated position, except relay 8, 76, 12, and 71. These are shown in the unoperated condition.

When Subscriber Y goes off hook (element 50) in the even line group, the LEO (even line equipment) receives a demand for service signal in the form of ground (+48 volts), appearing through ground 54, contacts 55 of operated line relay 51 and non-operated contacts 56 of the relay 76 and lead 70 to relay 57 through winding 57 to battery 58 in the even LEO line equipment group.

With relay 71 in an unoperated condition (solid line element 77), operation of the relay 57 from ground 59 from make contacts 60 through break contacts 61 of the relay 71, and on lead 62, which is connected so as to operate contacts 63 of relay 18, located in the fuse paneled meter circuit indicated by element 19—relay 18 is normally operated, as shown in FIG. 4A—then via lead 72 to relay 64 in the odd marker to battery 65 via lead 84 located in the even LEO. This state causes relay 64 to operate, closing contact 67, thus extending ground from element 66 through make contacts 67 via lead 68 to the winding 69 of relay 69 located in the even line group marker and thence to battery 74 via lead 80. This condition places a ground shunt toward relay 69 in the even marker and prevents its operation should it receive a ground on lead 75.

Relay 64 in its operative state causes an auxiliary relay (not shown) to operate. Operation of this auxiliary relay places a ground on a lead (not shown) back to the even LEO which causes relay 76 to operate. When relay 76 in the even LEO operates as a result of the operation of the above-mentioned auxiliary relay, the demand for service signal (ground) on lead 70 is broken thereby opening the contacts 60 of relay 57.

The even LEO alternator (relays 76, 57 and 71) is now isolated from all lines in the even line group until relay 76 is returned to its released condition. The even marker will now serve the even line group for processing a call to the point of selecting a register as described above.

Even Marker Seizure (originating Even Line Group)

When Subscriber Y goes off hook in the even line group (FIG. 4A), the even LEO receives a demand for service signal, ground from 54 through contacts 55 of operated line relay 51 and non-operated contacts 56 of relay 76 through lead 70 to relay 57 winding to battery 58 in the even LEO.

With relay 71 in an operated condition (dotted line, 77 make contacts), the operation of relay 57 places ground 59 from make contacts 60 of relay 57 through make contact 77 of relay 71 on to lead 78 to operated contacts 79 also a part of relay 18, located in the fuse panel meter (FPM) circuit plate 19. Relay 18 is normally operated. As a result, ground is then extended via lead 75 to the windings of relay 69 in the even marker then to battery 74 via lead 80 located in the even LEO. Such operates relay 69, which extends a ground from 81 through its made contacts 82 via lead 83 and 84 towards relay 74, located in the odd line group marker, and to battery 65 via lead 84. This state places a ground shunt towards relay 64 in the odd marker and prevents its operation, should it receive a ground on lead 72.

Operated relay 69 also causes an auxiliary relay (not shown) to operate. The operation of this auxiliary relay places a ground on the lead (not shown) back to the even LEO which causes relay 76 to operate. When relay 76 operates, the demand for service signal (ground) on lead 70 is terminated and this causes relay 57 to open (not operative).

The above described state places the even LEO alternator in isolated state, such being isolated from all lines in the even line group until relay 76 is returned to its released condition. The even marker will now serve the even line group for processing a call to the point of selecting a register.

Subscriber Line Relay Operation (Odd Line Group)—Subscriber X—FIG. 4A

When Subscriber X goes off hook (FIG. 4A) this shorts the Tip and Ring, completing the circuit from battery 2 to ground 3 and operating line relay 4 in the line equipment unit. Operation of line relay 4 is the first step in the process of identifying Subscriber X's telephone line and connecting it to an idle Originating-Reigster (REG-O). The REG-O (not shown) functions are as follows:

(a) to provide dial tone to the calling line.
(b) receive, store, and outpulses the dial digits (number called).

A typical line equipment unit contains 25 line relays and can serve 25 customer lines.

Line Entrance Originating (LEO) Operation

When line relay 4 operates it sends a demand for service signal in the form of ground to the odd LEO by extending ground 5 through operated contact 6 (line relay 4), made contacts 7 (relay 8) and lead 9 to operate relay 10 through its coil winding to battery 11 in the odd LEO. A typical LEO serves 500 lines and two associated line markers.

Odd Marker Seizure (originating odd line group)—Subscriber X

When Subscriber X goes off hook in the odd line group, the LEO receives a demand for service signal in the form of ground 5, through contacts 6 of the operated line relay 4 and non-operated contacts 7 of relay 8 via lead 9 to relay 10 winding to battery 11 in the odd LEO.

With relay 12 in a released (unoperated) condition, (solid line, element 32), the operation of relay 10 places a ground 13 from make contacts 14 of relay 10 through break contacts 15 of relay 12 on lead 16, which is connected to operated contacts 17 of relay 18, located in the fuse panel meter (FPM) circuit plate 19. Relay 18 is normally operated, and as a result, ground then appears, via lead 20 at the winding of the relay 21 in the odd marker thence to battery 22 located in the even LEO via lead 23. As a result of this state, relay 21 operates, causing ground to be extended from element 24 through make contacts 25 via lead 36 and 27 towards relay 28, located in the even line group marker and to battery 29 via lead 30. This state places a ground shunt towards relay 28 in the even marker and prevents its operation should it receive a ground on lead 31.

Operated relay 21 also operates an auxiliary relay (not shown). The operation of this auxiliary relay places a ground on a lead (not shown) back to the odd LEO, which causes relay 8 to operate, i.e. to open. When relay 8 in the odd LEO operates (unmade contacts) the demand for service signal (ground) appearing on lead 9 to relay 10 is terminated thereby opening relay 10.

Odd alternator is now isolated from all lines in the odd line group until relay 8 is returned to its released condition. The odd marker will now serve the odd line group for processing a call to the point of selecting a register.

Even Marker Seizure (originating Odd Line Group)—Subscriber X

When Subscriber X goes off hook in the odd line group, LEO receives a demand for service signal in the form of ground from element 5 through contact 6 of operated line relay 4 and non-operated contacts 7 of relay 8 through lead 9 to relay 10 and its windings on to battery 11 in the odd LEO.

With relay 12 in an operated condition (dotted line element 32), operation of relay 10 places a ground 13 from make contacts 14 of relay 10 through make contacts 15 of relay 12, such ground appearing on lead 33 and operated contacts 34 of the relay 18 located in the fuse panel meter (FPM) circuit plate 19. Relay 81 is normally operated. This being the case, ground then appears via lead 31 to the winding of the relay 28 in the even marker and to battery 29 located in the odd LEO, via leads 30 and 27. Such a state causes relay 28 to operate, which extends ground 37 through its made contacts 38 via lead 39 towards a winding 40 of relay 21, located in the odd line group marker and to battery 22 via lead 23. This action places a ground shunt towards the relay 21 in the odd marker thus preventing its operation should it receive a ground on lead 20.

Operated relay 28 causes an auxiliary relay (not shown) to also operate. The operation of this auxiliary relay places a ground on a lead (not shown) back to the odd LEO which causes relay 8 to operate. When relay 8 operates in odd LEO, the demand for service signal (ground) appearing on lead 9 is terminated, thus causing relay 10 to open (non-operative).

The odd LEO alternator is now isolated from all lines in the odd line group until the relay 8 is returned to its released condition. The odd marker will now serve the odd line group for processing a call to the point of selecting a register.

Figure 4B:
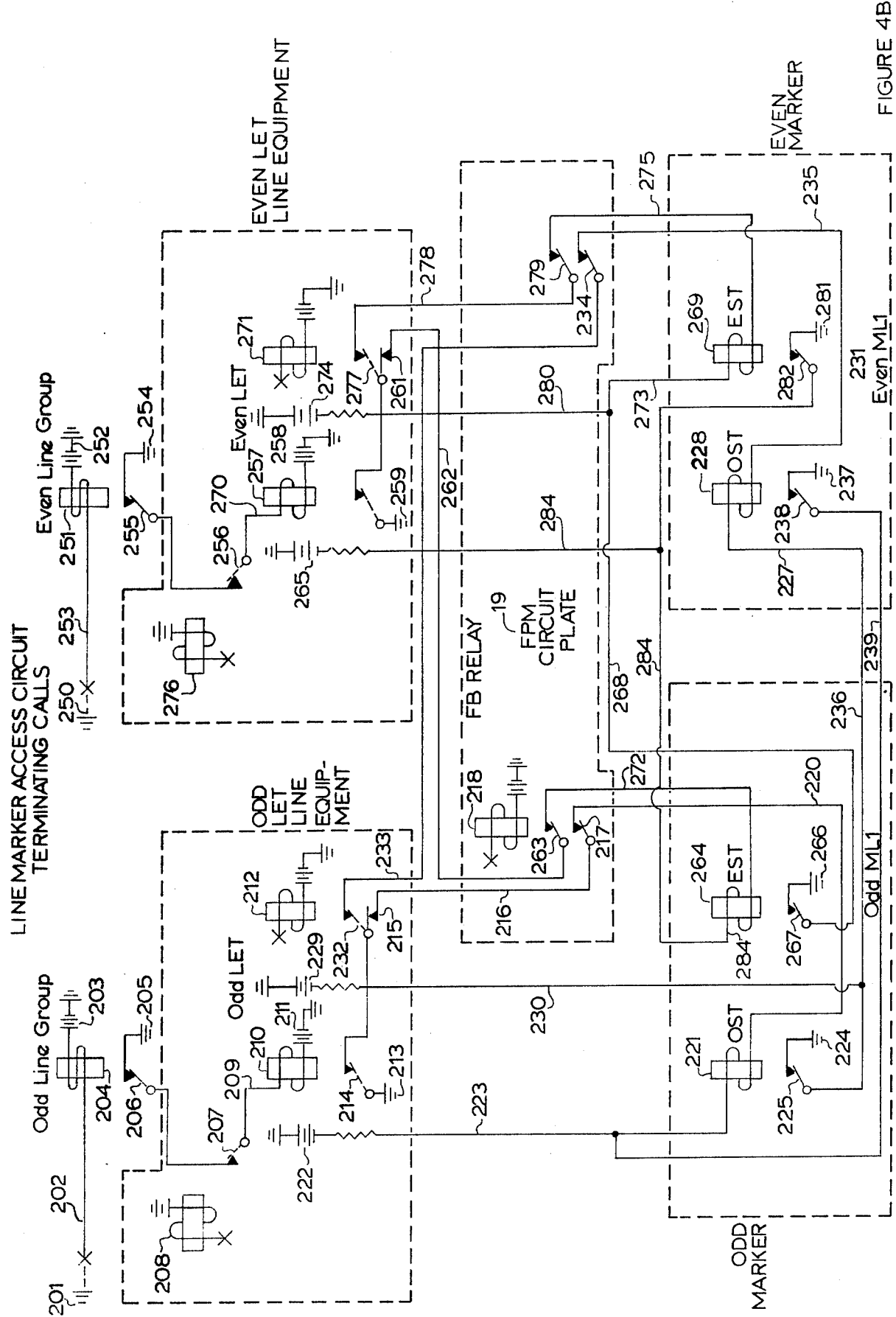

Incoming (Terminating) Call Operation (Even Line Group) FIG. 4B

When the Group Selector switches (not shown) operate, ground from element 250 is supplied to the sleeve lead 253 to a preselected Subscriber Terminating Trunk (STT) and operates Relay 251 through its coil windings to Battery 252. Relay 251 is also called HA relay.

Line Entrance Terminating (LET) Operation

When relay contacts 255 operates (operation of Relay 251), a demand for service signal is sent to the Even LET by extending ground 254 through operated contacts 255 (line relay 251), contacts 256 relay 276 and lead 270 to operate relay 257 through its coil winding to battery 258 in the even LET. A typical LET serves 500 lines and two associated line markers.

Overview of Alternator Circuit Operation in the Odd or Even LET

A marker is seized by a Line Entrance Terminating (LET) unit, there being one LET for each line group. Each LET is dedicated to one line group.

The circuit located in the LET, used to seize a marker, consists of three relays, 276, 257, and 271 and is called an alternator because of its ability to change from one inactive state to another. The inactive state that the alternator is in at the time it receives a call for service will determine which of the two markers it will attempt to seize. When relays 276, 257, and 271 are operated, i.e. in the position opposite from that shown in FIG. 4B, at the time a call for service is received, the alternator will attempt to seize the odd marker. When relays 276 and 271 are operated (as shown in FIG. 4B) at the time a call for service is received, the alternator will attempt to seize the even marker.

The active state of the alternator is that period of time in which relay 257 is operated and a predetermined number of milliseconds after it releases. It is during this time period that a marker is seized and the alternator is changed to its other inactive state.

Alternator Change (Odd or Even LET)

During the time that an attempt is made to seize a marker, the alternator must change the state of its relays in order to prepare for seizure of the other marker.

Alternator Changes with 276 and 271 Relays Released

Relay 257 receives ground from line Relay 251 operation and operates. Through its own break contacts 260 Relay 257 begins to slow release. A set of make contacts of Relay 257 begins to slow release. A set of make contacts of Relay 257 places a ground (through break contact of relay 256) on the operated winding of Relay 276. Relay 276 will operate but Relay 271 cannot operate at this time because it is receiving a ground shunt from Relay 257 through make contacts 260. Once Relay 257 releases, the ground shunt is removed from the energized windings of Relay 271, thus allowing Relay 271 to operate in series with Relay 276. Relays 276 and 271 remain operated after Relay 257 releases through the following completed series circuit: battery on the two sides of Relay 276, through the coil of 276, out one side, through make contacts 256 of Relay 276, into the two sides of Relay 271 through its coil, out one side to ground. The alternator is now prepared to seize the even marker, when Relay 257 is operated again.

Alternator Changed with Relay 176 and 171 Operated

Relay 257 receives ground from line relay 251 operation. When relay 257 is energized, its own slow release starts. At this time, with relays 276 and 271 in the operative position, Relay 271 is held operated through the contacts of Relay 271, which places ground from the Relay 257 to the hold winding of Relay 271. Relay 276 is released by ground appearing from the make contacts of Relay 257, which is routed to hold the coil of Relay 271 and the "knocked down" winding of Relay 276. Ground on this winding sets up a magnetic field equal to but opposite from the magnetic field of the relay 276 operated winding. These magnetic fields cancel each other, causing Relay 276 to release. When Relay 257 releases, it removes ground from the Relay 271 hold winding. Relay 271 then will release at this time due to the operative path of Relay 271 being broken by the previous release of Relay 276. The alternator is now prepared to seize the odd marker once Relay 257 is again operated.

Odd Marker Seizure—Terminating Even Line Group—(FIG. 4B)

With regards to FIG. 4B, all relays are shown in the operated position, except relay 208, 276, 212, and 271. These are shown in the unoperated condition.

When Relay 257 operates in the even STT, the LET (even line equipment) receives a demand for service signal in the form of ground (+48 volts), appearing through ground 254, contacts 255 of operated line relay 251 and non-operated contacts 256 of the relay 257 through winding 257 to battery 258 in the even LET line equipment group.

With Relay 271 in unoperated condition (solid line element 77), operation of Relay 257 extends ground 259 from make contacts 260 through break contacts 261 of the relay 271, and on to lead 262, which is connected to operated contacts 263 of relay 18, located in the fuse paneled meter circuit indicated by element 19—relay 18 is normally operated, as shown in FIG. 4A—then via lead 272 to relay 264 in the odd marker and to battery 265 via lead 284 located in the even LET. This state causes relay 274 to operate, closing contact 277, thus extending ground from element 266 through make contacts 277 via lead 268 to the winding 269 of relay 269 located in the even line group marker and thence to battery 274 via lead 280. This condition places a ground shunt toward relay 269 in the even marker and prevents its operation should it receive a ground on lead 275.

Relay 264 in its operative state causes an auxiliary relay (not shown) to operate. Operation of this auxiliary relay places a ground on a lead (not shown) back to the even LET which causes relay 276 to operate. When relay 276 in the even LET operates, as a result of the operation of the above-mentioned auxiliary relay, the demand for service signal (ground) on lead 270 is broken thereby opening the contacts 260 of relay 257.

The even LET alternator (relays 276, 257 and 271) is now isolated from all lines in the even line group until relay 276 is returned to its released condition. The even marker will now serve the even line group for processing a call to the called line.

Even Marker Seizure (Terminating Even Line Group)

When Relay 251 operates in the even STT, the LET line group receives a demand for service signal, ground from 254 through contacts 255 of operated line relay 251 and non-operated contacts 256 of relay 276 through lead 270 to relay 257 relay winding to battery 258 in the even LET.

With relay 271 in an operated condition (dotted line, 277 make contacts), the operation of relay 257 places ground 259 from make contacts 260 of relay 257 through make contact 277 of relay 271 on to lead 278 to operated contacts 279 of relay 18, located in the fuse panel meter (FPM) circuit plate 19. Relay 18 is normally operated. As a result, ground is then extended via lead 275 to the windings of relay 269 in the even marker and to battery 274 via lead 280 located in the even LET. Such a state operates relay 269, which extends a ground from 281 through its made contacts 282 via lead 283 and 284 towards relay 264, located in the odd line group marker, and to battery 265. This state places a ground shunt towards relay 264 in the odd marker and prevents its operation, should it receive a ground on lead 272.

Operated relay 269 also causes an auxiliary relay (not shown) to operate. The operation of this auxiliary relay places a ground on the lead (not shown) back to the even LET which causes relay 276 to operate. When relay 276 operates, the demand for service signal (ground) on lead 270 is terminated and this causes relay 257 to open (not operative).

The above described state places the even LET alternator in an isolated state, such being isolated from all lines in the even line group until relay 276 is returned to its released condition. The even marker will now serve the even line group for processing a call to the called line.

Odd Marker Seizure (Terminating odd line group)

When relay 4 operates in the odd STT as a result of Group Selector switches (not shown) operating and ground 201 is extended to sleeve lead 202 to a particular Subscriber Terminating Trunk (STT), the LET receives a demand for service signal in the form of ground 205, through contacts 206 of the operated line relay 204 and non-operated contacts 207 of relay 208 via lead 209 to relay 210 winding to battery 211 in the odd LET.

With relay 212 in a released condition, the operation of relay 210 places a ground 213 from make contacts 214 of relay 210 through break contacts 215 of relay 212 on lead 216, which is connected to operated contacts 217 of relay 18, located in the fuse panel meter (FPM) circuit plate 19. Relay 18 is normally operated, and as a result, ground then appears, via lead 220, at the winding of the relay 221 in the odd marker thence to battery 222 located in the even LET via lead 223. As a result of this state, relay 221 operates, causing ground to be extended from element 224 through make contacts 225 via lead 226 and 227 towards relay 228, located in the even line group marker, and to battery 229 via lead 230. This state places a ground shunt towards relay 228 in the even marker and prevents its operation should it receive a ground on lead 231.

Operated relay 221 also operates an auxiliary relay (not shown). The operation of this auxiliary relay places a ground on a lead (not shown) back to the odd LET, which causes relay 208 to operate, i.e. to open. When relay 208 in the odd LET operates (unmade contacts) the demand for service signal (ground) appearing on lead 209 to relay 210 is terminated thereby opening relay 210.

Odd alternator is now isolated from all lines in the odd line group until relay 208 is returned to its released condition. The odd marker will now serve the odd line group for processing a call to the called line.

Even Marker Seizure (Terminating Odd Line Group)

When relay 204 operates in the odd STT, the LET receives a demand for service signal in the form of ground from element 205 through contacts 206 of operated line relay 204 and non-operated contacts 207 of relay 208 through lead 209 to relay 210 and its windings on to battery 211 in the odd LET. Relay 204 is also called HA relay.

With relay 212 in an operated condition (dotted line element 232), operation of relay 210 places a ground 213 from make contacts 214 of relay 210 through make contacts 215 of relay 212, such ground appearing on lead 233 and operated contacts 234 of the relay 18 located in the fuse panel meter (FPM) circuit plate 19. Relay 18 is normally operated. This being the case, ground then appears via lead 235 to the winding of the relay 228 in the even marker and to battery 229 located in the odd LET, via lead 230. Such a state causes relay 228 to operate, which extends ground 237 through its made contacts 238 via lead 239 towards the windings of relay 221, located in the odd line group marker and to battery 222 via lead 233. This action places a ground shunt towards the relay 221 in the odd marker and prevents its operation should it receive a ground on lead 220.

Operated relay 228 causes an auxiliary relay (not shown) to also operate. The operation of this auxiliary relay places a ground on a lead (not shown) back to the odd LET which causes relay 208 to operate. When relay 208 operates in odd LET, the demand for service signal (ground) appearing on lead 209 is terminated, thus causing relay 210 to open (non-operative).

The odd LET alternator is now isolated from all lines in the odd line group until the relay 208 is returned to its released condition. The odd marker will now serve the odd line group for processing a call to the called line.

DESCRIPTION OF THE PREFERRED EMBODIMENT

Marker Testing Apparatus Description

Figure 5A:
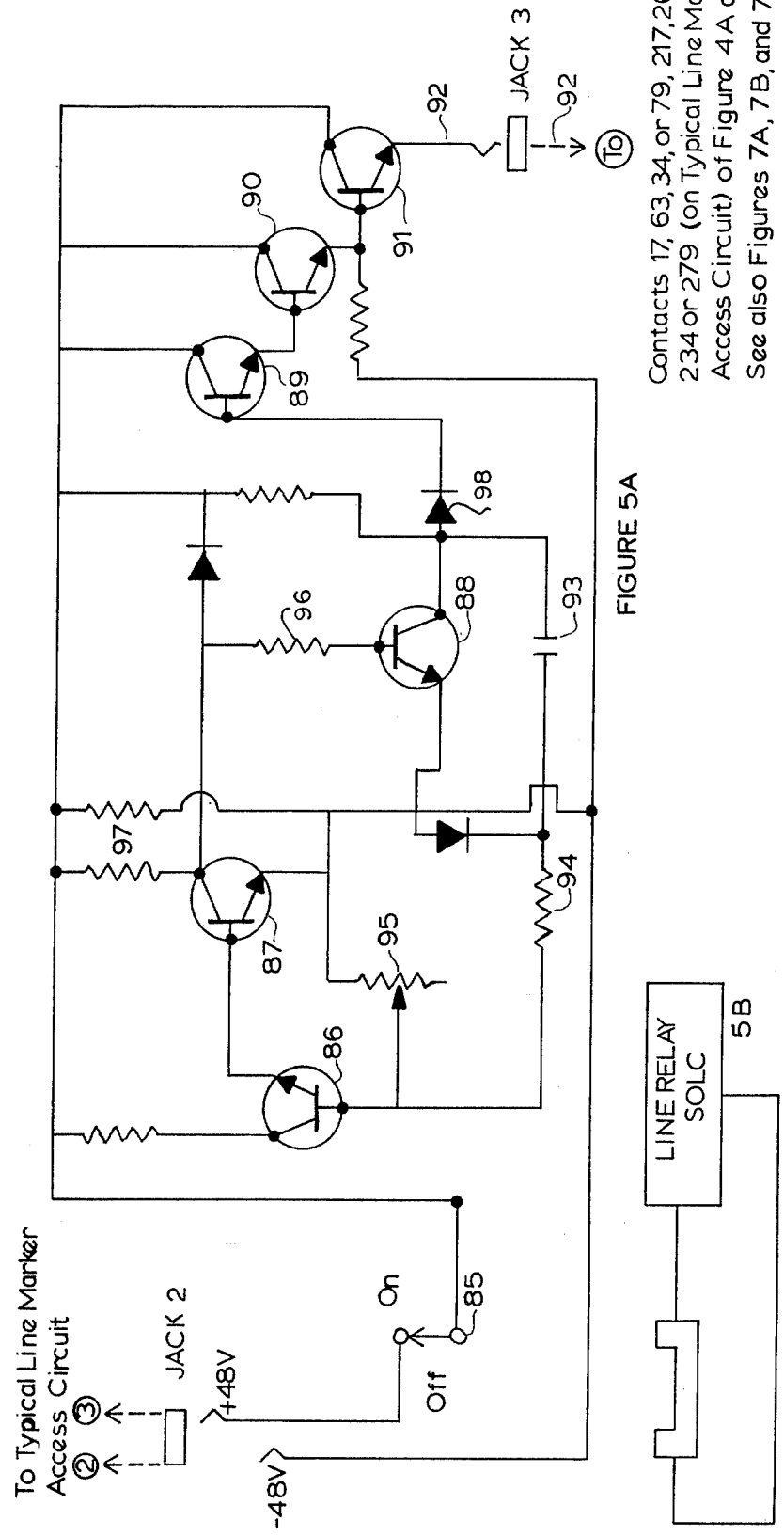
FIG. 5A is a schematic diagram of a testing circuit used to in-service test the line group markers of a crossbar type central office switching system using the access circuit of FIGS. 4A and 4B.

FIG. 5A is a schematic diagram of the circuit comprising the apparatus used in the instant invention to test a subscriber line group marker of a central office crossbar switching device.

Element 85 is a switch connected through transistor 86 to a variable resistor 95, and to the positive side of the central office battery jack number 2. The base of transistor 86 is connected through variable resistor 95 to the emitter of transistor 87. Transistors 86 and 87 are connected to one another in a Darlington fashion, i.e. the emitter of transistor 86 is connected to the base of transistor 87. The collective function of transistors 86 and 87 is to act as a timer. The collector of transistor 87 is connected (a) through resistor 97 and an unnumbered resistor to the collector of transistor 86, (b) through resistor 97 and switch 85 to +48 volts, and (c) through a blocking diode and resistor (unnumbered) to capacitor 93 and (d) through resistor 96 to the base of switching transistor 88. The collector of transistor 88 is connected to capacitor 93 and through switching diode 98 to the base of driver transistor 89. The emitter of transistor 88 is connected through a diode (unnumbered) and resistor 94 to the base of transistor 86.

Driver transistors 89, 90 and 92 are connected together in a Darlington fashion, i.e. the emitter of transistor 89 is connected to the base of transistor 90 and the emitter of transistor 90 is connected to the base of transistor 91. The collectors of transistors 89, 90 and 92 are all connected one to another and to +48 volts central office battery side. The base of transistor 91 and emitter of transistor 90 are connected through a resistor (unnumbered) to the negative side of central office battery jack (−48 volts). The emitter of transistor 91 is connected to lead 92 which is jack 3 of FIG. 6, the line that supplies power to the marker desired to be tested.

To complete the testing apparatus, an ordinary prior art telephone handset or a test code sender is used to detect the presence or absence of dial tone depending on the particular type marker under investigation, i.e. a marker associated with originating calls (FIG. 4A) or a marker associated with terminating calls (FIG. 4B), either a telephone handset or a test code sender is connected to the line relay of Subscriber Originating Line Circuit (SLOC), e.g. relay 4 or 51 of FIG. 4A or the Subscriber Terminating Trunk (STT), e.g. relay 204 and 251 of FIG. 4B respectively. See FIGS. 5B and C. Activation of circuit 5A and application of battery potential through a lead 92 to a particular marker will permit the presence or absence of dial tone to be observed over the telephone handset or test code sender (not shown), thus indicating an operable or faulty marker.

Marker Testing Device—Detailed Functional Description

Operation of Switch 85 to the "on" position supplies positive 48 volts to the collectors of transistors 86, 87, 88, 89, 90 and 91. Such a state presents a forward bias on the base of transistor 89 through diode 98 thus turning on transistors 89 and 90. The testing device contains a switching/timing circuit which is essentially composed of transistors 86 and 87 connected in a Darlington configuration with the emitter of transistor 86 directly driving the base of transistor 87. Transistors 89 and 90 are also connected in this same Darlington configuration.

With switch 85 closed as previously described and transistor 90 in the "on" state a forward bias is provided to the base of transistor 91, which is thus then turned on and provides an output positive voltage to appear on output lead 92. See also element 92 in FIGS. 7A, 7B, and 7C. Such would be the output potential to activate a particular marker for the purpose of testing it.

Switch 85 closure also provides a forward bias to the base of transistor 86 for a preset length of time, this length of time being based on the size of the RC circuit; namely capacitor 93 in combination with resistors 94 and 95, thereby turning on both transistors 86 and 87. This state causes transistor 87 to output 48 negative volts on its collector through resistor 96 to the base of transistor 88 thereby reverse biasing transistor 88 and causing it to be in an "off" condition. When capacitor 93 becomes fully charged, positive voltage no longer appears at the base of transistor 86. Transistor 86 then turns off. With 86 off, transistor 87 also turns off. With transistor 87 off, the minus 48 negative volt reverse bias is removed from the base as the result of positive voltage through resistors 97 and 96, thereby turning on transistor 88. With transistor 88 on, it outputs a negative 48 volts on its collector to diode 98, which then switches diode 98 to the off state. With diode 98 off, the forward bias from the base of transistor 89 is removed which in turn turns off transistor 90 and 91 and thus removes the positive 48 volts from the output lead 92. Capacitor 93 can be between 0.2 to 0.3 microfarads in value preferably 0.22 microfarads and resistors 94, 97 and 96 can be of 2,200; 4,700 and 100,000 ohms respectively. Variable resistor should have a range between 100,000 to 700,000 ohms.

Figure 6:
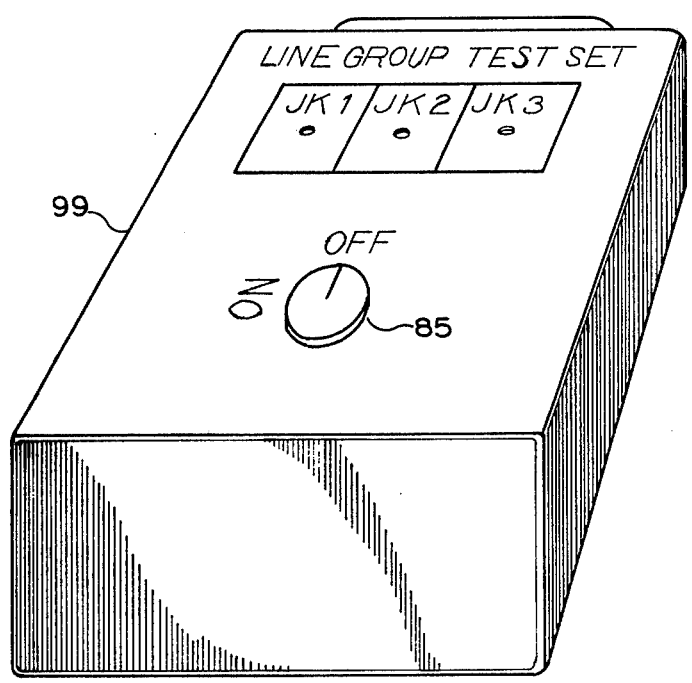
FIG. 6 is a pictorial representation of a testing device employing the circuit of FIG. 5A in its intended container showing appropriate jacks for connection to a test phone and other identified components of the circuitry of FIG. 5.

There is shown in FIG. 6 a case or a box 99 which encloses the circuit shown in FIG. 5. Jack 1 (JK1) is the receptacle into which a telephone handset or a prior art test code sender can be inserted. An example of a test code sender is one that is manufactured by North Electric Communications Division of United Utilities Incorporated and bears a product code of CA-9398. Alternatively, an ordinary telephone handset can be used. As shown in FIGS. 5B and 5C, jack 1 is a means to connect the telephone handset to the STT (Subscribing Terminal Trunk) or an SOLC (Subscriber Originating Line Circuit) represented by elements 51 and 4A and elements 251 and 204 of FIG. 4B.

Jack 2 is a receptable in which connection is made to the power source (central office battery), for example either elements 2 or 52 of FIG. 4A, 203 or 252 of FIG. 4B. Jack 3 of FIG. 6 is the output lead on which battery potential is supplied by the tester to those leads shown in FIGS. 7A, 7B, and 7C of the typical line marker access circuit of FIGS. 4A and 4B.

Activation of switch 85 to the on position causes a pulse of central office battery potential of a predetermined time determined by the values of the testers RC circuit to be supplied on lead 92. With jacks 1, 2 and 3 in their proper connection, such will activate a marker in the same manner as a subscriber going off hook or detection of an incoming call from a distant office as previously described. Switch 85 must be returned to its off position and then turned again once more to the on position to cause another pulse to be applied. If upon activating switch 85 to the on position dial tone is observed, then the marker is in working order. Otherwise, the marker is faulty.

It will be appreciated that the functions of the circuit components described above (transistors, diodes, capacitor and resistors) shown in FIG. 5A can be carried out by integrated circuits, commonly referred to in the electronic industry as "chips." Applicant regards such chips as equivalents to the circuit components shown.

Examples of Test Set Connections to a Typical Line Marker Access Circuit

Figure 7A:
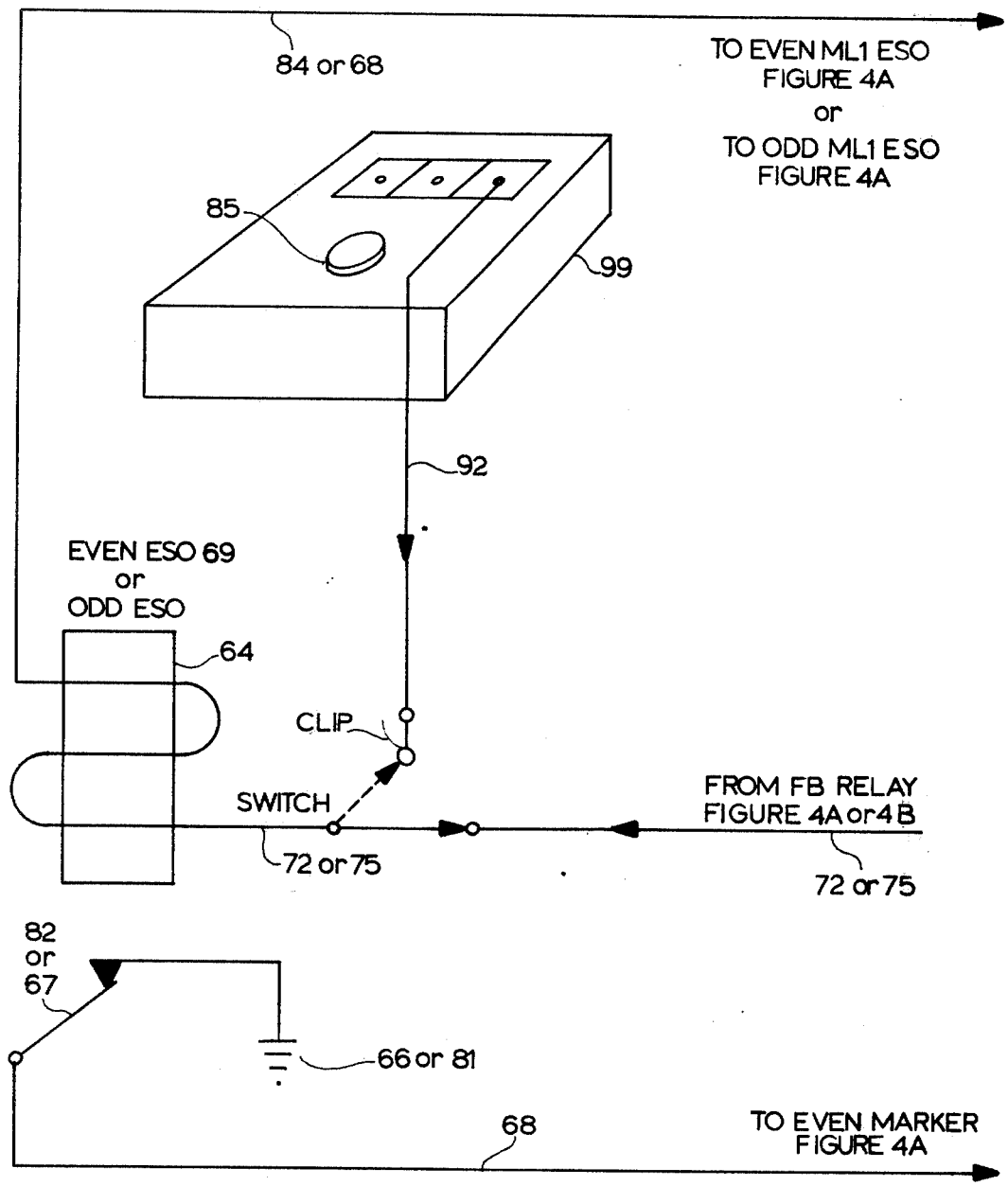
FIGS. 7A, 7B, and 7C are schematic diagrams describing different embodiments of how the output lead of the testing device shown in FIGS. 5A and 6 may be connected to the circuitry of FIGS. 4A and 4B, employing switch, jack configuration and paper insulators respectively.
Figure 7B:
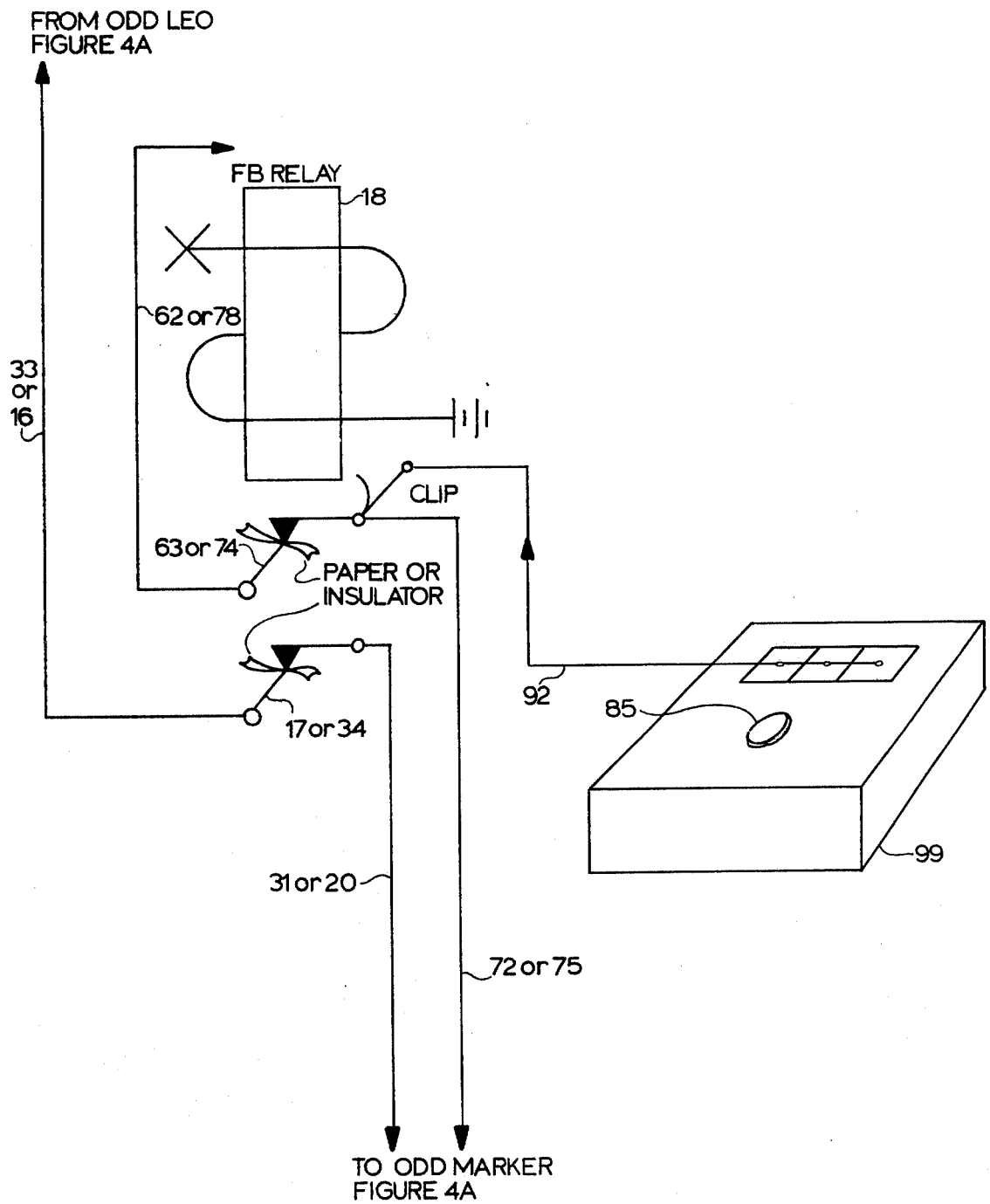
Figure 7C:
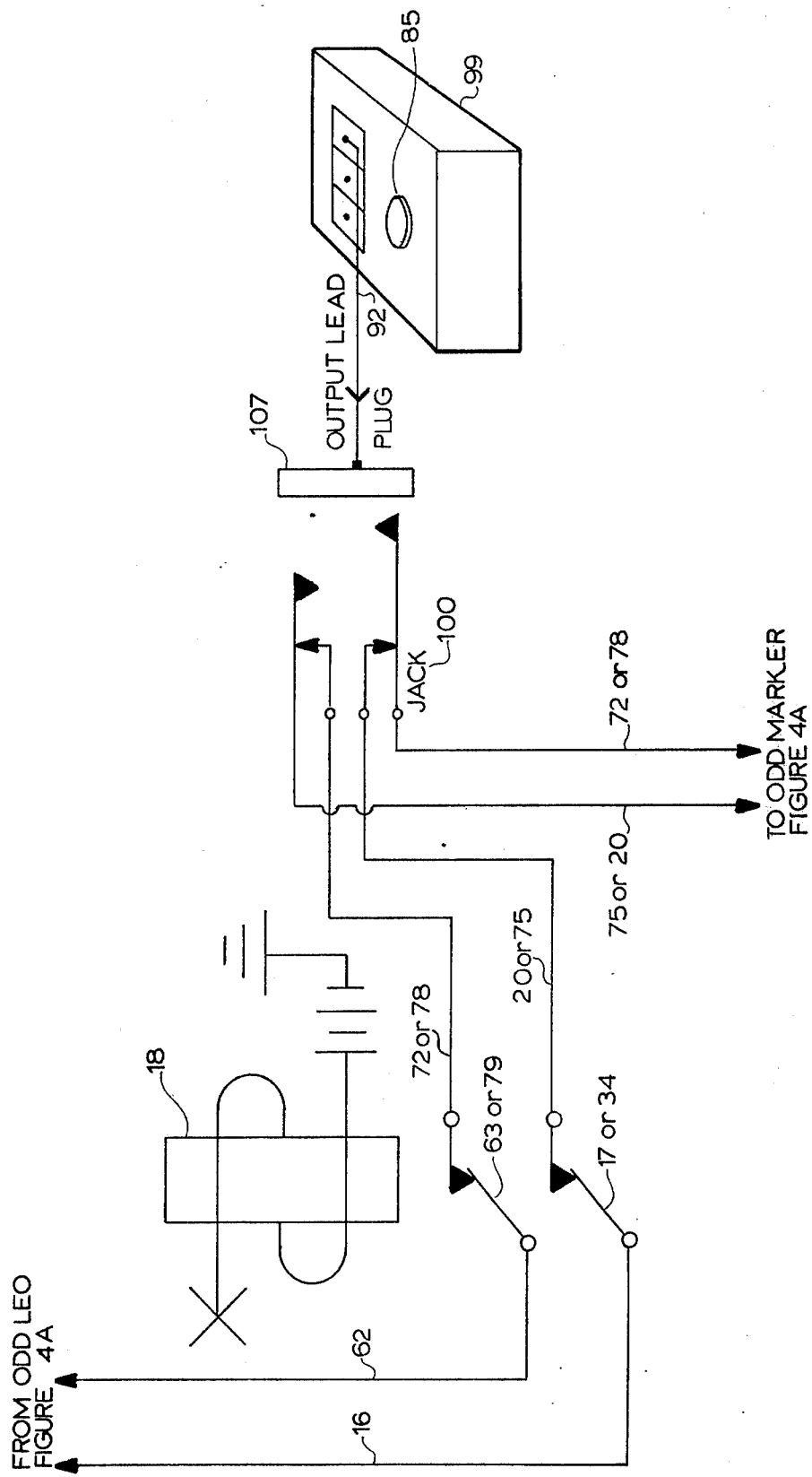

FIGS. 7A, 7B, and 7C all relate to and describe different embodiments of the testing device 99 of the instant invention connected to the line access marker service described in FIG. 4A, the circuit relating to originating calls. Since the circuit of 4B (line access marker circuit) for terminating calls, is essentially a duplicate of the circuit of FIG. 4A, similar connections are made for the same purpose. Between the originating and terminating call line access marker circuits, there are four markers, two for each circuit. That is to say, there are odd and even markers for the line marker access circuit for the originating calls (4A) and an odd and even markers for the line access circuit terminating calls (FIG. 4B).

To emphasize the similarity between the equipment of FIGS. 4A and 4B but to make sure it is understood that the equipment shown in FIG. 4A is a separate apart from the equipment shown in FIG. 4B, apart from truly common equipment relay 18 in FBM circuit plate 19, element numbers used in FIG. 4A are used on complimentary elements in FIG. 4B, plus an increment of 200, e.g. elements 4 and 51 of FIG. 4A are designated as elements 204 and 251 respectively in FIG. 4B.

FIGS. 7A, 7B, and 7C set forth three embodiments of how the test set of the instant invention is to be connected to the line marker access circuits schematically represented in FIG. 4A. Methods of attachment to the circuit of 4B are identical.

When a marker is suspect as being faulty, for example the even marker in the originating call access marker circuit, contacts for both the odd and even marker, relays 64 and 69 respectively, are electrically blocked by anyone of the modes described in FIGS. 7A, 7B, or 7C.

To test the even marker of FIG. 4A, reference is made to the connections disclosed in FIG. 7A. Output lead 92 (jack 3) is attached to lead 72. For odd marker testing, using the mode of FIG. 7A, lead 75 is substituted for lead 72, contact 82 for 67 and relay 69 for relay 64. In order to test markers in the line access marker circuit for terminating calls, "200 series number" elements are used and identical connections made in preparation for activating the testing device.

Connections shown in FIG. 7A are for testing the even marker of FIG. 4A. Lead 92 from the test set 99 (jack 3) is interconnected with lead 72 by a switch and a clip in a manner well known in the art, the switch obviously being in the closed poistion when it is desired to activate the test set. To test the odd marker of the same Figure, 4A, using this configuration, lead 68 is substituted for lead 84, lead 83-84 for lead 68, lead 75 for lead 72, relay 82 for relay 67 and relay 69 for 64. To test the like odd or even marker in the circuit of FIG. 4B, like connections are required but using the "200 number series" elements of FIG. 4B in combination with tester 99.

FIG. 7B sets forth another embodiment of test set connection using paper insulators. Contacts 63 and 79 or 79 and 34 are insulated with paper to break the circuit and output lead 92 from test set of FIGS. 5 and 6 is attached to lead 72 in the indicated position by a clip in a manner well known in the art.

The connection shown in FIG. 7B is for testing the odd marker of FIG. 4A. To test the even marker of the same Figure, using this configuration, lead 33 is substituted for lead 16, lead 78 is substituted for lead 62, marker contact 79 is substituted for contact 63 and contact 34 is substituted for contact 17. Also lead 31 is substituted for lead 20 and lead 75 is substituted for lead 72. To test the like odd or even marker in the circuit of FIG. 4B, terminating call marker access circuit, like connections are required using the "200 number series" elements of FIG. 4B in combination with tester 99.

FIG. 7C shows another example of test set 99 connection using a jack and plug configuration, connected to the circuit of a typical line marker access circuit. This embodiment requires a jack 100 (an otherwise closed path) to be inserted into leads 72 and 78 or 20 and 75 so that they may be opened by insertion of output lead plug 101. Potential from the central office battery through tester 99 and lead 92 can then be applied directly to the marker sought to be tested.

The connection shown in FIG. 7C is for testing the odd marker of FIG. 4A. To test the even marker of the same figure, using this configuration, lead 78 is substituted for lead 16, lead 33 for lead 62, contact breaker 79 for contact breaker 63, contact breaker 34 for contact breaker 17, lead 75 for lead 72, lead 31 for lead 20. To test the like or odd or even marker in the circuit of FIG. 4B, terminating call access circuit, like connections are required using the "200 numbered series" elements of FIG. 4B in combination with tester 99.

SUMMARY

From the foregoing description it can be readily seen that a normally open electrical path exists between the even and odd markers of the line marker access circuit shown in FIGS. 4A and 4B and central office battery potential. This path, however, is closed in response to either Subscriber X or Y going off hook on an incoming call from a distant office. Both of these operations are known in the prior art. In order to test a specified marker in either the originating or terminating line access circuit, after the manner of the instant invention, this normally open path is obstructed so that it remains open even though Subscriber X or Y goes off hook in the central office in which testing is desired and/or an incoming call from a distant office is presenting a signal (ground) and thus demanding line group marker service.

Examples (different embodiments) of how the above-mentioned electrical obstruction can be accomplished are shown in FIGS. 7A, 7B, and 7C. A normally open electrical path is provided from the central office battery to the marker to be tested, see output lead 92 in FIG. 5 and the same element in FIGS. 7A, 7B, and 7C.

Interposed in such path is a switching/timing circuit as described by the schematic of FIG. 5A. By placing switch 85 of tester 99 in the on position, closing the last mentioned electrical path from the central office battery to the marker, the RC circuit of the switching/timing circuit causes a pulse of ground potential to be applied for a predetermined time to the marker. To send another pulse to the marker, the switch must be returned to the off position and then turned on once again. Once the marker has been energized by the switch being turned in the off position, testing personnel can tell if the marker is functioning properly or not by observing the presence or absence of dial tone over the telephone handset test equipment or test code sender 102 of FIGS. 5B or 5C. Failure of dial tone indicates a faulty marker.

It is obvious from the above that the pulse of ground potential supplied by the RC circuit to the marker is of a duration in the order of milliseconds and is of an arbitrary choosing with respect to the time that such a pulse is applied. Theoretically, the instant the pulse is applied, any subscriber who at that particular time is going off hook or an incoming call or both would be competing with the testing personnel for the marker that is desired to be tested. Only during the instant the pulse is applied may anyone, subscriber or tester, seize the marker because of its otherwise electrical isolation. It is therefore possible, but not very likely, that the competing subscriber would somehow be fortunate enough to seize an electrical path to the marker, in which the relays operate faster, and therefore be able to seize the target marker prior to seizure of same by the testing personnel. The odds for this happening are believed by applicant to be somewhat astronomical and such an event has not been observed by applicant during tests of the disclosed testing equipment in its intended environment. As a result, all of the competing subscribers for the marker desired to be tested are effectively if not practically precluded from preempting service from a target marker desired to be tested by testing personnel using the method and device disclosed. Irrespective of the traffic involved at a particular central office, testing personnel can use the disclosed testing device and method and be virtually assured that upon activation of the switch of the testing device the marker in question will be seized and its proper function can be determined or a malfunction identified.

I claim:

1. A method of energizing a preselected marker in a telephone central office switching apparatus wherein such markers are energizable by application of central office battery potential thereto through a first path in said central office switching apparatus that is normally open but closed in response to an off hook condition of a subscriber's telephone connected to said central office or an incoming call from another central office demanding service so that the instant of time desired to energize such marker is essentially under the sole control of a testing party, comprising the following steps:
    (a) electrically obstructing said normally open first path of the central office switching apparatus so that it remains open even when said central office subscriber goes off hook or an incoming call from another central office is demanding service;
    (b) providing a normally open second electrical path independent from said aforementioned open path referred to in step (a) from a source of battery potential directly in said marker; and (c) at an instant of arbitrary choosing, closing of said last mentioned electrical path and applying for a predetermined time said battery potential directly to the marker to energize same.

2. A method as described in claim 1 having additional steps of providing a telephone receiver in electrical communication with the marker and observing by means of said telephone receiver the presence or absence of dial tone after the application of said central office battery potential of step (c).

3. A testing circuit for applying a predetermined potential for a predetermined length of time, said circuit comprising:
   (a) a switch and first and second transistors, said switch being connected between the collectors of said first and second transistors and a battery potential, the emitter of the first transistor being connected to the base of the second transistor;
   (b) third, fourth, fifth and sixth transistors, said third, fourth and fifth transistors being connected together in a Darlington configuration, the collectors of said third, fourth and fifth transistors being connected to the collectors of said first and second transistors and to said switch, the base of said third transistor being connected through a diode to the collector of said sixth transistor;
   (c) a capacitor and a resistor, the base of said sixth transistor being connected to the collector of said second transistor, its emitter being connected to the base of said first transistor and its collector being connected in series with said capacitor, said resistor and the base of said first transistor.

4. A testing circuit of claim 3 including a variable resistor, said variable resistor being connected between the emitter of said second transistor and the base of said first transistor.

5. A testing circuit of claim 4 wherein said variable resistor has a range between 100,000 to 700,000 ohms.

6. A testing circuit of claim 3 wherein said capacitor has a value between 0.2 and 0.3 microfarads.

* * * * *